UNITED STATES PATENT OFFICE.

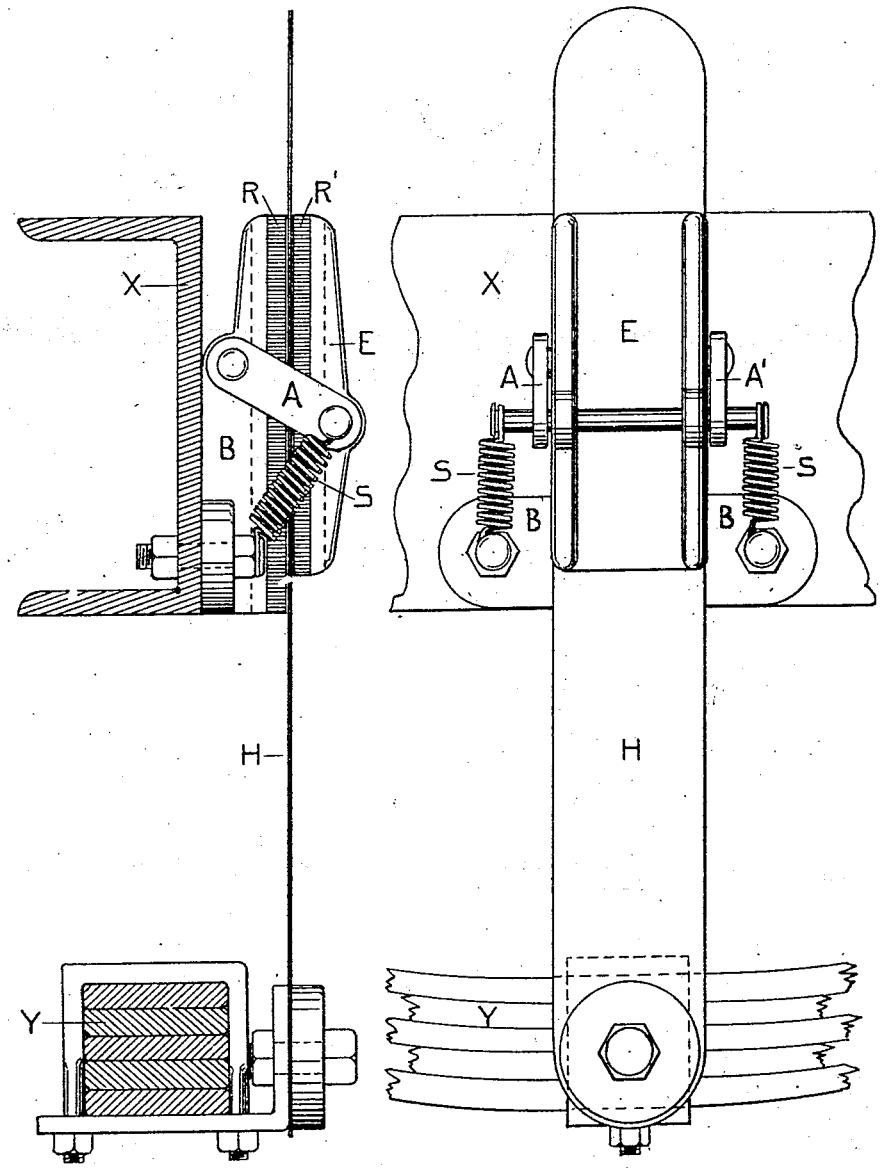

FLETCHER W. BATTERSHALL, OF ALBANY, NEW YORK.

SHOCK-ABSORBER.

No. 850,460. Specification of Letters Patent. Patented April 16, 1907.

Application filed February 10, 1906. Serial No. 300,452.

*To all whom it may concern:*

Be it known that I, FLETCHER W. BATTERSHALL, a citizen of the United States, residing at Albany, in the county of Albany and State of New York, have invented a new and useful Shock-Absorber or Machine for Retaining the Motion of Moving Bodies by Friction, of which the following is a specification.

My invention is a machine for automatically retarding the speed of a moving body in one or both directions, as desired, in proportion to the velocity of said movement, so that when such movement is sudden, violent, or of great force it is restrained in proportion to the suddenness, violence, and force of said movement and the same is rendered gentle, easy, and uniform.

The device or machine may be employed so as to restrain the motion reciprocating or direct of any part of another machine or in particular may be used to control the rebound or compression, as desired, of springs on vehicles. When so used, the device is popularly called a "shock-absorber," and has for its purpose to cause the body of such vehicle to ride easily over rough surfaces by restraining and softening the violent rebound of the springs after compression. I attain these objects by the mechanism illustrated in the accompanying drawings, in which similar letters refer to similar parts in the two views of the device shown.

In the drawings, Figure 1 shows a side elevation of the device, and Fig. 2 a front elevation thereof, both views showing the device attached to the body-frame of a vehicle X and to the spring Y of the running-gear of a vehicle.

B is a friction plate or jaw fastened by any suitable attachment to the body whose movement is to be controlled with respect to another body—as, for example, to the body-frame of a vehicle X.

E is another friction plate or jaw facing B and connected with or hung from B by one or more links A A', which are pivoted on studs or bolts passing through B and E, said links allowing E to move freely with a vertical movement parallel to B. One such link is sufficient if pivoted in slots cut in the center lines of B and E; but two links are preferred, as shown. It is the action of these links in constraining the jaws B and E to approach each other and forcibly grip a plate moving between them or to separate and free such plate, according to the direction of the motion of said plate, that comprises the essential feature of this device.

I know that others have used a plate or bar moving in a friction device before and do not claim the broad principle, but confine myself to the particular kind of friction device here described or its equivalent.

H represents the plate which the jaws B and E are designed to grip by friction or to release, according to the direction of its motion. It may be of any shape, but preferably flat, thin, and of good breadth to give ample friction-surface. If made thin and tempered, it is flexible and allows for the side sway of a vehicle if attached to the running-gear thereof, Y, as shown. It is immaterial whether the members B or H be attached to the moving body or whether they be severally attached to two bodies moving in relation to each other. The member H moves between the members B and E, which are brought into contact therewith by the weight of E if the device be used vertically or by the additional aid of a spring S, which may be flat, spiral, or of any suitable form, and which spring may be adjusted to move the member E in relation to the member B in either direction, up or down, or with any desired degree of force dependent upon the force of the spring used or upon any suitable device (not shown) for varying the tension of said spring. The links A A' determine the relative position of the members B and E and being swiveled, as shown, allow the member E to move to a limited extent in relation to the member B. The members B and E where they touch the member H act as friction-surfaces and may be lined, if preferred, with any suitable friction material R R.

To illustrate the action of the device, if the member B be suddenly drawn upward and the member H be suddenly drawn downward, as on the recoil of an elliptical vehicle-spring to the upper and lower leaves of which said members are supposed to be severally attached, the slight friction between the members E, B, and H will cause the member E to adhere to the member H and be drawn downward, and the links A' limit such downward movement of the member E according to the degree of angularity of said links with the members E and B and cause E to be drawn more or less forcibly toward the member B, and hence will bind the member H between said friction-surfaces R R and will retard the motion of the member H downward and the motion of the member B upward in proportion to the violence and suddenness of said motion, rendering the same gradual and easy, for the pressure of the members E and B upon the member H will be lessened in proportion as the movement of the members H and B is retarded. When movements in directions opposite to the movements aforesaid take place, as when B moves downward and H moves upward on the supposed compression of an elliptical vehicle-spring, such motion is not checked, for the member H, being in slight contact with the member E, moves E upward, and the links A A move the member E away from the member B, and thus relieve the friction between the members H, E, and B.

Hence by the action, as above illustrated, and under the particular application of the device assumed said vehicle-springs will have a free and unimpeded movement downward; but excessive and violent recoil from such movement is checked and retarded in direct proportion to the violence, suddenness, and force of such recoil.

The gripping or retarding action of this device may be varied by changing the angularity of the links A A with the members B and E, or, in other words, by changing the ratio between the width and thickness of the member H and the length of the links A A. The nearer the links A approach a right angle (under conditions of rest) with the member B the greater will be the gripping or retarding effect of the device. Said effect can also be adjusted by any suitable device for changing the tension of the spring S if used.

If no spring is used, the device under proper adjustment will retard motion in both directions as may be desired, or the direction in which the retarding action takes place may be at any time changed by reversing the direction in which the spring S urges the member E in relation to the member B.

The advantages of this device over other devices employed for the same purpose are, first, it automatically takes up wear; second, it automatically adjusts the friction to the strain; third, it is not brought into action by slight movements, and thus will allow full resiliency to a vehicle-spring when the motion thereof does not become excessive; fourth, its retarding power is in proportion to the suddenness and violence of the movement sought to be restrained; fifth, it will restrain motion in one direction or in both directions, as desired; sixth, it is capable of adjustment to all conditions; seventh, it is cheaper in manufacture than any other device used for the same purpose and broken or damaged parts can be easily, quickly, and cheaply replaced or repaired.

I claim—

1. In a machine for restraining a moving body by friction, two friction-plates acting upon that body and a link or links movably connecting said friction-plates and pivoted on both of them so as to allow one friction-plate to move longitudinally and toward and away from the other.

2. In a machine for restraining a moving body by friction, two friction-plates acting upon that body and a link or links movably connecting said friction-plates and pivoted on both of them, and a spring or springs forcing said friction-plates into contact with said moving body.

3. In a machine for restraining the recoil of springs of vehicles by friction, a friction-clutch fastened to the superstructure of said vehicle and acting upon a bar fastened to the running-gear of said vehicle, said friction-clutch consisting of two friction-plates and a link or links movably connecting said friction-plates and pivoted on both of them so as to allow one friction-plate to move longitudinally and toward and away from the other.

4. In a machine for restraining the vibration of springs of vehicles by friction, a friction-clutch adapted to act upon a bar fastened to the spring-seat of said vehicle, said friction-clutch consisting of two friction-plates and a link or links movably connecting said friction-plates and pivoted on both of them, and a spring or springs forcing said friction-plates into contact with said bar.

5. In a machine for restraining the recoil of springs of vehicles by friction, a means of automatically proportioning the amount of said friction to the violence of the recoil, said means consisting of a friction-plate attached to the superstructure of said vehicle and connected with another friction-plate by a link or links pivoted on said friction-plates, a spring or springs urging said friction-plates toward each other, and a bar attached to the running-gear of said vehicle and interposed between and acted upon by said friction-plates.

6. In a machine for restraining the recoil of springs of vehicles, in combination with the superstructure and running-gear of said vehicle, a friction-plate attached to said superstructure and connected with another friction-plate by one or more links pivoted on said friction-plates, a bar interposed between said friction-plates and attached to the running-gear of said vehicle.

7. In a machine for restraining the recoil of springs of vehicles, in combination, a friction-plate attached to the superstructure of said vehicle, another friction-plate opposed to the first, a link or links connecting said friction-plates and pivoted on both of them, a spring or springs connected with both of said friction-plates and urging them together, a bar interposed between said friction-plates and attached to the running-gear of said vehicle.

FLETCHER W. BATTERSHALL.

Witnesses:
JAMES B. FISHER,
STEPHEN C. FIERO.